Nov. 26, 1957

P. H. CROFT 2,814,506

UNIVERSAL TRAILER HITCH BUMPER CLAMP

Filed Sept. 29, 1953

Paul H. Croft INVENTOR.

United States Patent Office 2,814,506
Patented Nov. 26, 1957

2,814,506

UNIVERSAL TRAILER HITCH BUMPER CLAMP

Paul H. Croft, Tacoma, Wash., assignor to Croft Trailer Company, Tacoma, Wash., a partnership Application September 29, 1953, Serial No. 382,891

5 Claims. (Cl. 280—502)

My invention relates to trailer hitches; more particularly my invention relates to detachable trailer hitch bumper clamps which may be easily and quickly detached from and attached to automobile bumpers.

A primary object of my invention is to provide a trailer hitch having a bumper clamp which is quickly attachable and detachable to and from automobile bumpers. This object is particularly desirable in the business of renting trailers for use behind private automobiles.

Another primary object of my invention is to provide a trailer hitch bumper clamp which may be applied to a wide variety of sizes and shapes of automobile bumpers.

I attain these objects by my invention, an embodiment of which is ilustrated in the accompanying drawing in which—

Figures 1, 2:
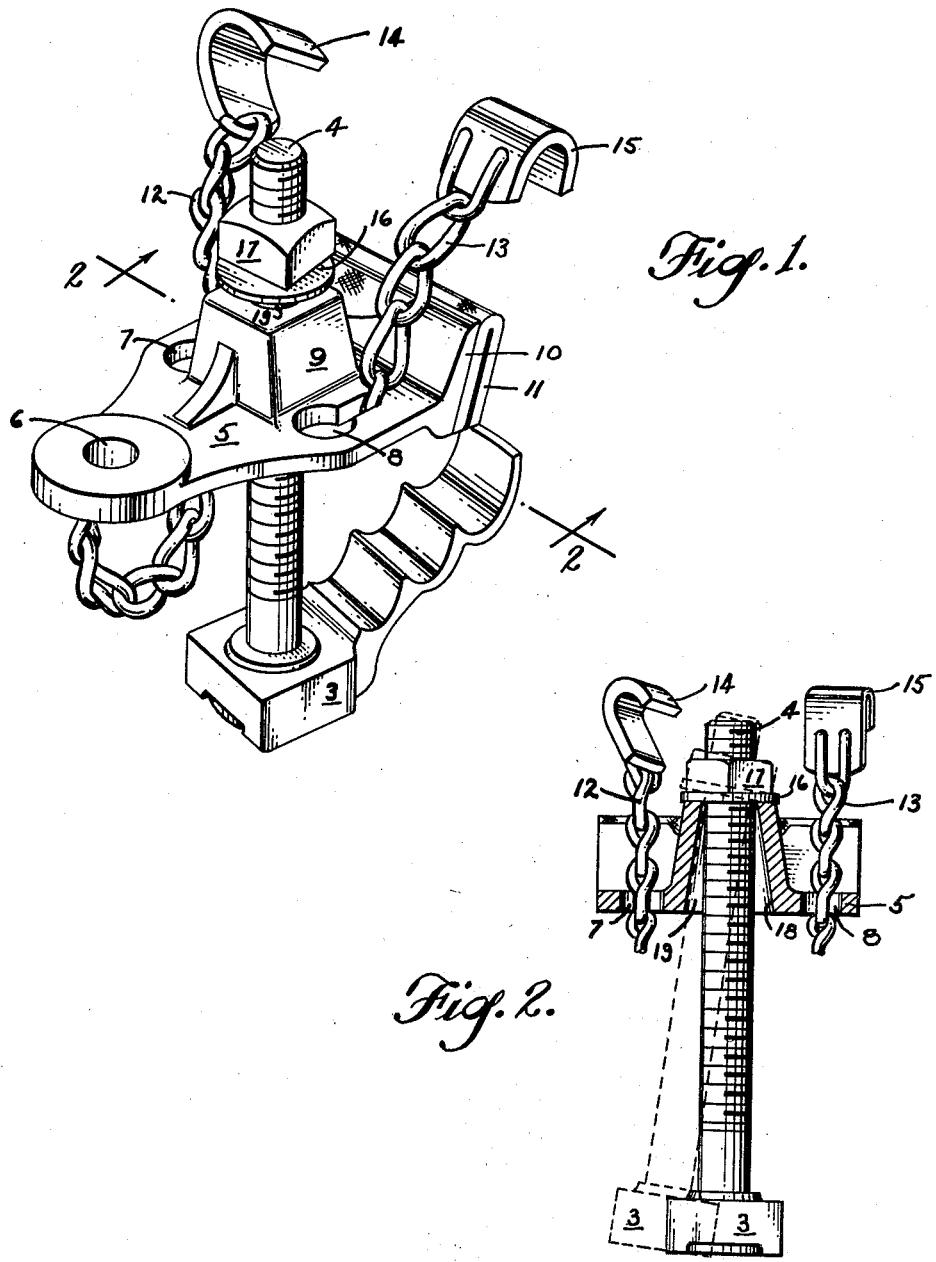
Figure 1 illustrates a perspective view of a trailer hitch bumper clamp embodying my invention.
Fig. 2 is a view in rear elevation taken cross-sectionally along line 2—2 of Fig. 1.

Referring now to Figure 1, the illustrated trailer hitch bumper clamp embodying my invention comprises a multiple jawed bumper hook 3 to which bolt 4 is fixedly attached; the bolt 4 carries hitch plate 5 which hitch plate 5 provides hitch-receiving opening 6, chain-receiving slots 7 and 8, and carries bolt block 9. Hitch plate 5 also carries butt plate 10 to which butt plate 10 a resilient pad 11 is fixedly attached. Chain-receiving slots 7 and 8 carry chains 12 and 13. Chain 12 is fixedly attached to bumper hook 14; chain 13 is fixedly attached to bumper hook 15. The hitch plate 5 surrounds bolt 4 and is held on bolt 4 by means of washer 16 and nut 17.

From Fig. 2 it may be seen that the inner wall 18 of the bolt block 9 incloses bolt-receiving opening 19 provided by bolt block 9. It may also be seen that the wall 18 tapers upwardly providing freedom for angular movement of bolt 4 carrying hook 3. This freedom of movement is depicted in Fig. 2 by the broken lines showing bolt 4 and hook 3 in a relatively extreme angular position. The inner wall 18 of the bolt block 9 by reason of its taper obviously provides greater freedom of movement of the hook 3 than would be possible if the wall 18 were straight rather than tapered. On the other hand, if the wall 18 were straight and the bolt receiving opening 19 enlarged with respect to the diameter of the bolt 4, support for the washer 16 and the nut 17 as provided by the shoulders of the bolt block 9 would be substantially lost.

The hitch plate 5 provides chain receiving slots 7 and 8 formed oppositely on either side of the bolt block 9.

The bolt block 9 may be formed integrally with the hitch plate 5 as in a single forging or may be formed separately and then fixedly attached to the hitch plate 5. The butt plate 10, likewise, may be separately fabricated and then fixedly attached to the plate 5 or may be forged or otherwise machined integrally with the hitch plate 5.

The mode of operation of my invention is as follows: The hitch plate 5 carrying the bolt 4 engaged in the bolt-receiving opening 19, bolt 4 being adjustably and loosely held in position by means of the washer 16 and the nut 17, is held against the rear bumper of the automobile to which the trailer hitch bumper clamp is to be applied. That is to say, the butt plate 10 of hitch plate 5 is placed against the bumper of the automobile with the resilient pad 11 intervening. The hook 3 is then swung into position in which one of the jaws is engaged with the lower edge of the bumper. The bumper hooks 14 and 15 are then hooked over the upper edge of the automobile bumper. The butt plate 10 is then pulled tightly against the surface of the bumper by means of chains 12 and 13 and the chains 12 and 13 are locked into the chain-receiving slots 7 and 8 by twisting the links. A final tightening of the bumper clamp to the bumper is made by tightening the nut 17 against the washer 16 and the shoulder of the bolt block 9.

I claim:

1. A universal trailer hitch bumper clamp for supporting a substantial portion of a trailer and being characterized by ready adaptability to a wide variety of bumper configurations and sizes, said trailer hitch bumper clamp comprising a generally horizontal hitch plate having a generally vertically extending bumper contacting butt plate on the forward end thereof, said hitch plate having vertically extending therethrough a chain receiving keyhole slot adjacent to said butt plate, said chain receiving keyhole slot in turn comprising a relatively narrow chain retaining portion extending forwardly toward said butt plate and a relatively wide chain passing portion extending away from said butt plate, said generally horizontal hitch plate further having a vertically extending hitch receiving opening at the rear thereof and a bolt block in the central area thereof, said bolt block having a vertically extending bolt receiving opening, a multiple jawed bumper hook designed to engage the lower edge of a bumper, said multiple jawed bumper hook having a bolt extending upwardly therefrom, the shank portion of said bolt passing upwardly through and being adjustably retained in said bolt block by a nut bearing against the upper surface thereof, and a bumper chain passing through said keyhole slot and extending upwardly from said hitch plate, said bumper chain having an upper bumper edge engaging hook secured to the upper extremity thereof, said bumper chain being in retained engagement with said chain receiving slot, the length of said chain enabling its selective lengthwise positioning in the narrow portion of said keyhole slot, the said lower bumper hook and the said chain mounted upper bumper hook being relatively adjustable with respect to each other from above the hitch plate by means of the relative positioning of said chain in said keyhole slot and by means of adjustment of said nut on said bolt shank extending upwardly through said bolt block, the said combination and arrangement as to adjustability enabling vertical centering and levelling of said hitch plate with respect to the bumper for a wide variety of bumper widths and cross sectional contours.

2. A trailer hitch bumper clamp according to claim 1, said hitch plate having generally flat side and rear edge areas, the said bolt block at the generally central area thereof having the upper surface substantially above the level of said generally flat side and rear areas.

3. A trailer hitch bumper clamp according to claim 2, wherein said bolt receiving opening in said bolt block comprises inwardly tapered walls of enlarged lower dimension in the area of said bolt shank for selective angular positioning of said hitch plate with respect to the said bolt extending upwardly from the said multiple jawed bumper hook when said chain connected bumper hook, said butt plate, and said multiple jawed bumper hook are in bumper engaging position.

4. A trailer hitch bumper clamp according to claim 1, wherein said hitch plate is provided with a laterally arranged pair of keyhole slots, one on each side of said bolt block, and a bumper chain passing through each said keyhole slot and extending upwardly from said hitch plate, each said bumper chain having an upper bumper edge engaging hook secured to the upper end thereof.

5. A trailer hitch bumper clamp according to claim 4, wherein said bolt block is formed of sloping walls between the hitch plate edge areas and a raised bearing surface portion offset away from the lower bumper hook, said sloping walls distributing the weight over said hitch plates, said sloping walls further having a bolt receiving opening defined by inwardly tapered walls, enlarged in the area of said base plate.

References Cited in the file of this patent

UNITED STATES PATENTS

| | | |
|---|---|---|
| 2,306,007 | Thorp | Dec. 22, 1942 |
| 2,338,934 | Gross | Jan. 11, 1944 |
| 2,435,813 | Williams | Feb. 10, 1948 |
| 2,468,438 | Galen | Apr. 26, 1949 |
| 2,474,078 | Wilcox | June 21, 1949 |
| 2,542,907 | Dayton et al. | Feb. 20, 1951 |
| 2,672,353 | Gross | Mar. 16, 1954 |
| 2,678,221 | Kohlsaat | May 11, 1954 |
| 2,726,880 | Klein | Dec. 13, 1955 |

FOREIGN PATENTS

| | | |
|---|---|---|
| 706,806 | France | June 30, 1931 |